(12) United States Patent
Okabe et al.

(10) Patent No.: US 8,323,592 B2
(45) Date of Patent: Dec. 4, 2012

(54) METHOD AND APPARATUS FOR RECOVERY OF RARE EARTH ELEMENT

(75) Inventors: Toru H. Okabe, Tokyo (JP); Sakae Shirayama, Tokyo (JP)

(73) Assignee: The Foundation for the Promotion of Industrial Science, Tokyo (JP)

( * ) Notice: Subject to any disclaimer, the term of this patent is extended or adjusted under 35 U.S.C. 154(b) by 118 days.

(21) Appl. No.: 12/934,112

(22) PCT Filed: Mar. 26, 2009

(86) PCT No.: PCT/JP2009/056079
§ 371 (c)(1),
(2), (4) Date: Sep. 23, 2010

(87) PCT Pub. No.: WO2009/119720
PCT Pub. Date: Oct. 1, 2009

(65) Prior Publication Data
US 2011/0023660 A1    Feb. 3, 2011

(30) Foreign Application Priority Data

Mar. 26, 2008 (JP) ................................. 2008-080577
Feb. 2, 2009  (JP) ................................. 2009-021953

(51) Int. Cl.
C22B 59/00        (2006.01)
(52) U.S. Cl. ........................ 423/21.1; 423/263
(58) Field of Classification Search .................... 75/610; 423/21.1, 263
See application file for complete search history.

(56) References Cited

U.S. PATENT DOCUMENTS 3,131,082 A * 4/1964 Gambino ....................... 428/432
3,748,095 A * 7/1973 Henderson et al. ............. 423/21.1

FOREIGN PATENT DOCUMENTS

| JP | 04-036427 A | 2/1992 |
| JP | 2002-012921 A | 1/2002 |
| JP | 2002-060855 A | 2/2002 |
| JP | 2003-073754 A | 3/2003 |
| JP | 2003073754 A * | 3/2003 |

OTHER PUBLICATIONS

Machine translation of JP 2003-073754 A published Mar. 2003.*
Translation of International Preliminary Report on Patentability of PCT/JP2009/056079, dated Nov. 18, 2010, 7 pages.

* cited by examiner

*Primary Examiner* — Roy King
*Assistant Examiner* — Tima M McGuthry Banks
(74) *Attorney, Agent, or Firm* — Foley & Lardner LLP

(57) ABSTRACT

Disclosed is a method for recovering a rare earth element from a rare earth alloy, which has improved extraction efficiency of the rare earth element from the rare earth alloy, and is applicable to the extraction of various rare earth elements. The method is characterized by comprising a step of immersing the rare earth alloy in a molten salt of a halide salt to cause the elution of a halide of the rare earth element into the molten salt, or a step of reacting a rare earth alloy scrap which coexists with at least one of Fe and Cu with a metal chloride gas at a temperature of 1300 to 1800K to selectively extract the rare earth element contained in the rare earth alloy scrap as a vapor of a chloride of the rare earth element.

3 Claims, 14 Drawing Sheets

METHOD AND APPARATUS FOR RECOVERY OF RARE EARTH ELEMENT

TECHNICAL FIELD

The present invention relates to a method and an apparatus for recovery of rare earth element.

BACKGROUND ART

A neodymium magnet is a permanent magnet mainly containing a neodymium-iron-boron (Nd—Fe—B)-based intermetallic compound ($Nd_2Fe_{14}B$). The neodymium (Nd) magnet has some advantages of excellent magnetic property, high strength and not expensive manufacturing cost and thus applied for various industrial products so that the amount of production of the neodymium magnet is remarkably increased. As the main use of the neodymium magnet can be exemplified a voice coil motor for a hard disk, a compressor motor of an air conditioner and a motor for a hybrid car. Since the compressor of the air conditioner or the motor of the hybrid car requires high coercive force at high temperature, a neodymium magnet containing dysprosium (Dy) added thereto would be used so as to increase the coercive force. In the future, the consumption of the neodymium magnet containing Dy is much remarkably increased with the increase of the hybrid car, so that it is expected that a large amount of magnet scraps are generated.

A good ore deposit relating to a rare earth element such as Nd and Dy which are raw materials for the Nd magnet is localized in a specific country so that the cost of the rare earth element is likely to be fluctuated due to the export restriction of the specific country. In this point of view, the anxiety for the stable supply of the rare earth is growing. Moreover, since an ore containing the rare earth element also contains a radioactive element such as uranium (U) and/or thorium (Th), the mining of the ore may cause serious problems such as an environmental destruction and a concentrated radioactive substance treatment. As for Dy, there is an ion adsorptive ore deposit almost free from such a radioactive element, but this type of deposit is geologically rare, and in addition may destroy the environment in the vicinity of the ore deposit because an acid is injected into the soil of the ore deposit in the mining of the ore and the extraction of rare earth elements from the ore. Since Nd is relatively rich as a resource, there is not almost anxiety for the exhaust of Nd. However, when Nd is obtained from the corresponding ore, the problem of treating the radioactive elements contained therein cannot be avoided. In view of the environmental destruction relating to the mining and refining of the ore and the increase in demand of Nd in the future, the recovery of Nd from the product scraps is important subject. At present, however, the recycle of the rare earth element from products is not almost conducted except the recycle of the rare earth element from large sized products such as magnets for MRI.

By the way, as the recycle method of the Nd magnet, the recovering method where an iron chloride is contacted with the scraps of rare earth magnets or the magnet sludges thereof (the sludge of the rare earth magnets) so that the intended rare earth elements are recovered as the corresponding chlorides is proposed (refer to Reference 1). In the invention, the mixture of a solid iron chloride, an activated carbon and the magnet sludges is heated and then distilled so that the chlorides of the corresponding rare earth elements and the iron chloride are separated and recovered. According to the invention, a neodymium oxide such as $Nd_2O_3$ can be efficiently recovered by converting the oxide into the corresponding chloride, but only an iron chloride ($FeCl_2$) with high reducibility can be utilized as a reducing agent because the chemical reaction proceeds under a carbon-reducing atmosphere and high chlorine partial pressure atmosphere.

Reference 1: JP-A 2003-073754 (KOKAI)

DISCLOSURE OF THE INVENTION

Problem to be Solved by the Invention

According to the technique disclosed in Reference 1, Nd and Dy can be recovered from the corresponding Nd magnets and magnet sludges, but since the rare earth alloys are various, it is not promised that the technique disclosed in Reference 1 can be employed in the future. Particularly, the development of the selective separation/recovery technique in rare earth element at high effectiveness and efficiency where the intended rare earth elements are separated and recovered from the scraps of large sized magnets used for high powered motors of automobiles is socially important problem.

It is an object of the present invention to provide a recovery method and apparatus of rare earth element which have high efficiency in the extraction of a rare earth element from the corresponding rare earth alloy and thus can be applied for various rare earth elements.

Means for Solving the Problem

In order to solve the problem, an embodiment of the present invention relates to a recovery method of rare earth element, including a step of immersing a rare earth alloy in a molten salt of a halide salt to extract a rare earth halide in the molten salt.

According to the embodiment, an intended rare earth element can be extracted from a rare earth alloy by the simple method of the immersion in a molten salt. Moreover, since not only iron chlorides but also various halide salts can be employed as the halide salt functioning as a reaction medium, an appropriate reactive medium can be selected depending on the kind of rare earth alloy and the kind of rare earth element to be recovered.

The molten salt containing a rare earth halide may be vaporized and recovered. According to the recovery method, the rare earth halide can be easily separated from the molten salt. If a halide salt with a lower vaporizing temperature is employed as the extraction medium, the rare earth halide can be vaporized at a higher concentration so as to obtain the corresponding halide gas with the higher concentration. As a result, the separation efficiency of the rare earth halide can be enhanced.

Another embodiment of the present invention relates to a recovery method of rare earth element, including a step of supplying a halide salt vaporized in advance or a halogen gas to a rare earth alloy to recover a rare earth halide produced in a state of gas or liquid.

According to the embodiment, since the halide salt or the halogen gas as the reactive medium is supplied in the state of gas, an intended rare earth element can be extracted from a complicated rare earth alloy in shape. Moreover, since various halide salts can be employed for the halide salt functioning as the reaction medium in addition to the iron chloride, an appropriate reactive medium can be selected depending on the kind of rare earth alloy and the kind of rare earth element to be recovered.

Still another embodiment of the present invention relates to a recovery method of rare earth element, including a step of reacting a rare earth alloy scrap coexisting with at least one of Fe and Cu with a metallic chloride gas within a temperature range of 1300K to 1800K to selectively extract, separate and recover a rare earth element of the rare earth alloy scrap in a state of a vapor of a corresponding rare earth element chloride.

According to the embodiment, an intended rare earth element can be selectively chlorinated in the state of the rare earth alloy scrap using a metallic chloride gas, and a vapor of the rare earth element chloride with a practical vapor pressure can be generated so that the rare earth element chloride can be efficiently recovered.

A further embodiment of the present invention relates to a recovery method of rare earth element, including a step of reacting a rare earth alloy scrap containing at least one of Nd and Dy and coexisting with at least one of Fe and Cu with at least one metallic chloride gas selected from the group consisting of $FeCl_x$, $CuCl_x$, $ZnCl_x$ within a temperature range of 1300K to 1800K to selectively extract, separate and recover the at least one of Nd and Dy in a state of a vapor of a corresponding rare earth element chloride.

According to the embodiment, since the reaction between the metallic chloride gas and the coexisting metal such as Fe and Cu can be suppressed, Nd or Dy can be recovered as a chloride vapor efficiently. Moreover, since harmful waste cannot be produced, the recovery method of this embodiment is environment-friendly.

A still further embodiment of the present invention relates to a recovery method of rare earth element, including a step of reacting a rare earth alloy scrap containing at least one of Nd and Dy and coexisting with at least one of Fe and Cu with a metallic iodide gas to selectively extract, separate and recover the at least one of Nd and Dy in a state of a vapor of a corresponding rare earth element iodide.

According to the embodiment, the metallic iodide gas is supplied to produce and recover the vapor of the corresponding rare earth element iodide. Since the vapor pressure of the iodide gas is higher than the vapor pressure of the chloride gas, the reaction temperature can be lowered.

Another embodiment of the present invention relates to a recovery method of rare earth element, including the steps of: immersing a rare earth alloy in a molten salt of a halide salt to extract a rare earth halide in the molten salt; distilling the molten salt containing the rare earth halide extracted therein at a predetermined temperature so that the molten salt is separated into a gas component, a liquid component and a solid component containing the rare earth halide; and dissolving the solid component in a solvent to separate therefrom, refine and reduce a rare earth element.

According to the embodiment, the rare earth element can be extracted from the rare earth alloy by the simple method of the immersion in a molten salt. Since the recovery method of this embodiment includes the steps of distilling the molten salt containing the rare earth halide at a predetermined temperature so that the molten salt is separated into the gas component, the liquid component and the solid component containing the rare earth halide; and dissolving the solid component in a solvent to separate, refine and reduce the rare earth element, the rare earth element extracted in the molten salt can be recovered certainly. Moreover, since various halide salts can be employed for the halide salt functioning as the reaction medium in addition to the iron chloride, an appropriate reactive medium can be selected depending on the kind of rare earth alloy and the type of rare earth element to be recovered.

The gas component and the liquid component separated by the distillation may include at least one of a metal composing the halide salt and the halide salt.

According to the recovery method, since such a compound as the rare earth halide is positively contained in the solid component, the rare earth element can be efficiently recovered by dissolving the solid component into the solvent so as to separate, refine and reduce the rare earth element. Therefore, since the control in the distillation and separation can be relatively simplified, the rare earth element can be separated certainly by the simple method of dissolving the rare earth halide contained in the solid component in the solvent, so that the extraction recovery rate of the rare earth element can be enhanced.

Moreover, the gas component and the liquid component separated by the distillation may include at least one of a metal composing the halide salt and the halide salt, and the recovery method may include the step of refining and reducing the rare earth halide contained in the gas component and the liquid component.

According to the recovery method, since the rare earth halide is partially separated as the corresponding gas component and liquid component, the extraction rate of the rare earth element can be enhanced as a whole even though the amount of the rare earth halide contained in the remaining solid component is decreased. Moreover, when the distillation and separation process is conducted, the rare earth element can be recovered from the solid component even though the rare earth halide is contained in the solid component. In comparison with the case that in the distillation and separation process the rare earth halide is separated as the corresponding gas component and liquid component, the condition in the distillation and separation process can be relatively relaxed.

It is preferable that the solid component includes a solid mixture of a residue of the rare earth alloy after an extraction of the rare earth element and the rare earth halide.

It is preferable that the halide salt includes a compound made of at least one metal selected from the group consisting of Li, Na, K, Rb, Be, Mg, Ca, Sr, Ba, Ti, V, Cr, Mn, Fe, Co, Ni, Cu, Zn, Al, Si, Cd, Sb and Pb and at least one halogen selected from the group consisting of F, Cl, Br, and I, or a mixture of the compounds with respective different compositions.

Concretely, it is preferable that the halide salt has a high reactivity for the rare earth element of the rare earth alloy. Moreover, such a halide salt as having a high vapor pressure is preferable or such a halide salt as having a high vapor pressure in the reaction product of the halide salt is preferable so that the halide salt can be easily distilled and separated from the rare earth alloy or from the solid component produced through the reaction of the halide salt.

More concretely, it is preferable that the halide salt is a zinc iodide. Since an iodide gas has a higher vapor pressure than a chloride gas, the temperature in the distillation/separation process can be lowered.

It is preferable that the rare earth element to be recovered from the rare earth alloy is at least one selected from the group consisting of Nd, Dy, Pr, Tb.

Namely, the present invention is preferably employed for the recovery of a rare earth element from a magnetic material product such as a Nd magnet, a Pr magnet and a magneto-optical disk.

It is preferable that the rare earth alloy includes a rare earth alloy containing at least one of Nd and Dy and coexisting with at least one of Fe and Cu.

Effect of the Invention

According to the present invention, the rare earth element can be extracted from the rare earth alloy at high efficiency by the direct extraction using the immersion for the molten salt or the gas. Moreover, since a given reactive medium selected from various halide salts or halogen gases can be employed, the present invention can be applied for various rare earth elements.

According to the embodiments of the present invention, the rare earth element can be extracted from the rare earth alloy by the simple method of the immersion in the molten salt. Alternatively, the molten salt can be separated into the gas component and the liquid component in the distillation/separation process so that the rare earth element contained in the solid component can be recovered by the simple process. Moreover, since various halide salts can be employed for the halide salt functioning as the reaction medium in addition to iron chloride, an appropriate reactive medium can be selected depending on the kind of rare earth alloy and the kind of rare earth element to be recovered, and thus applied for various rare earth elements.

EXPLANATION OF SYMBOLS 100, 200 . . . Extraction apparatus, 101 . . . Alumina tube, 102, 201 . . . Reaction chamber, 202, 103 . . . Heater, 104 . . . Thermometer, 105, 311 . . . Sponge titanium (getter material), 110, 210 . . . Rare earth alloy, 111 . . . Wire, 112 . . . Stainless foil, 113 . . . Steel crucible, 114 . . . Molten salt, 115 . . . Scrap holding basket of stainless steel, 117 . . . Inlet of molten salt raw material, 118 . . . Lid, 203 . . . Gas inlet, 204 . . . Gas outlet, 300 . . . Extraction apparatus, 301 . . . Alumina tube, 302 . . . Reaction chamber, 303 . . . Heater, 304 . . . Stopper plug, 305 . . . Intake and exhaust port, 306 . . . Titanium foil

BEST MODE FOR IMPLEMENTING THE INVENTION

First Embodiment

Figure 1:
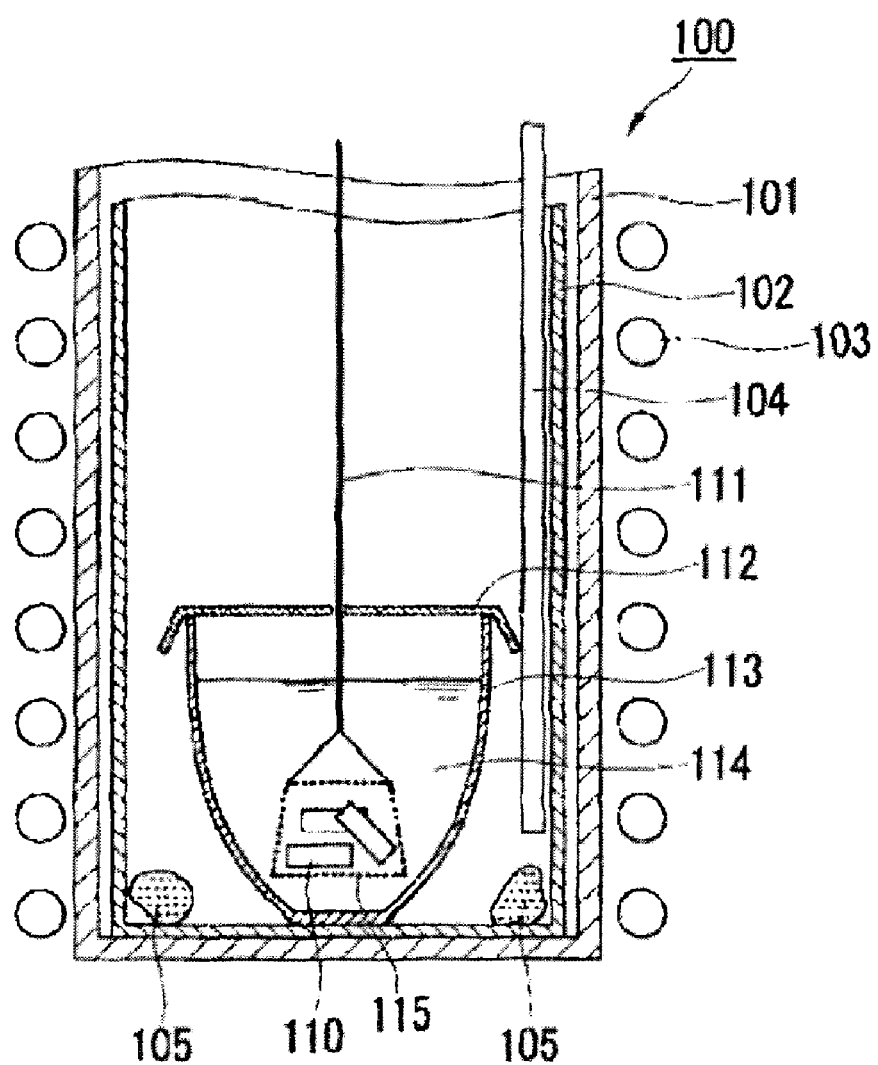
FIG. 1 is a view showing the extraction apparatus according to a first embodiment.

FIG. 1 is a view showing an embodiment of the extraction apparatus to be used in the recovery method of rare earth element in this embodiment. An extraction apparatus 100 shown in FIG. 1 includes a cylindrical thermal insulating chamber made of a thermal insulating material such as alumina ceramic material (hereinafter, called as a "alumina tube") 101, a reaction chamber 102 made of a heat and corrosion-resistant steel which is installed in the alumina tube 101, a heater 103 set around the alumina tube 101 and a steel crucible 113 provided in the reaction chamber 102. Herein, the alumina tube 101 has a bottom surface in addition to the side surface (periphery thereof). In the reaction chamber 102, a thermometer 104 for measuring an interior temperature of the reaction chamber 102 and a sponge titanium (getter material) 105 are provided. In the steel crucible 113, a molten salt 114 and a stainless steel scrap holding basket 115 hung with a wire 111 are provided. In the stainless steel scrap holding basket 115, a rare earth alloy 110 such as a neodymium (Nd) magnet is disposed.

Figure 2:
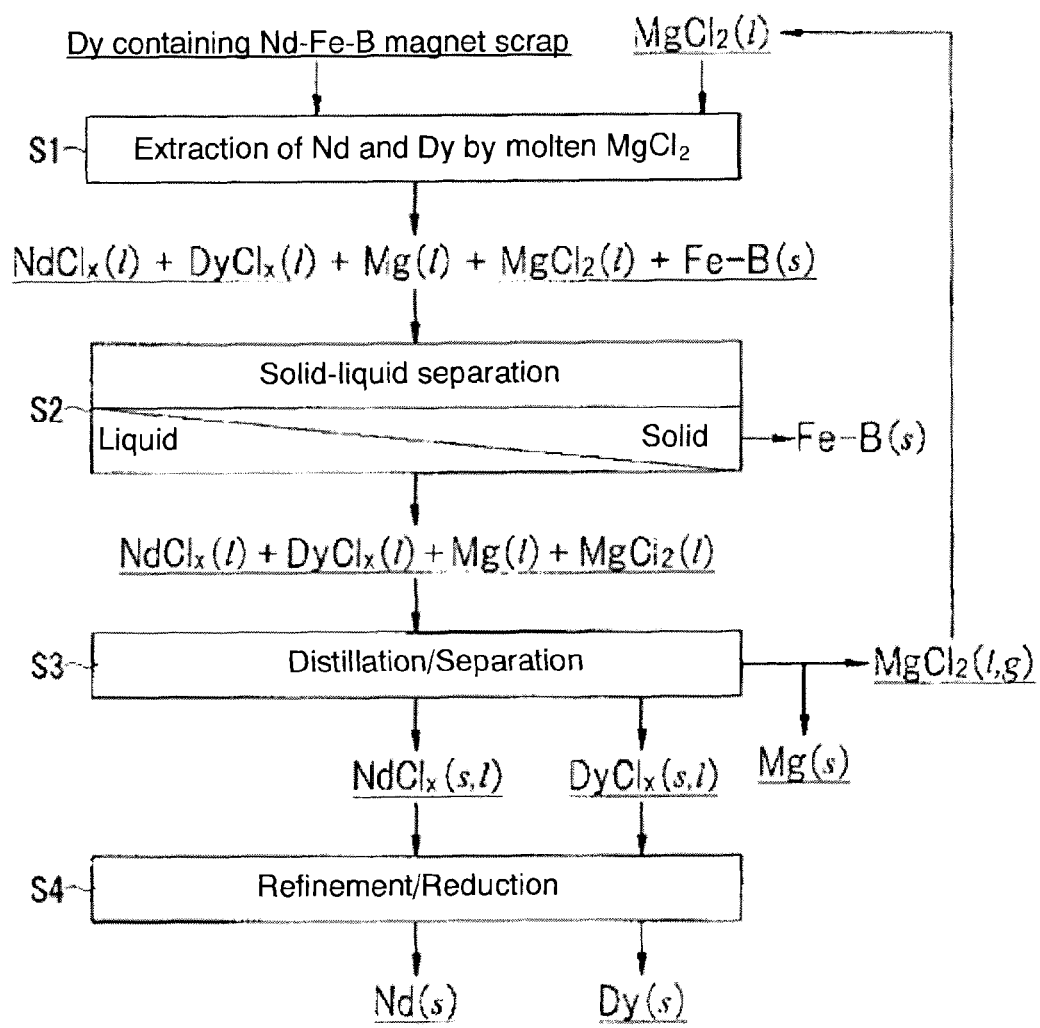
FIG. 2 is a flowchart showing a recovery method of rare earth metal according to the present invention.

FIG. 2 is a flowchart showing a recovery method of rare earth metal according to the present embodiment. As shown in FIG. 2, the recovery method in this embodiment includes a step S1 of extracting a rare earth element (Nd, Dy, etc.) from a rare earth alloy (e.g., a Dy-containing Nd magnet) using a halide salt (e.g., $MgCl_2$), a step S2 of separating a solid component and a liquid component after extraction, a step S3 of separating a rare earth halide (NdClx, DyClx, etc.) from the liquid component separated in the step S2, and a step S4 of refining and reducing the rare earth halide to obtain the rare earth element (Nd, Dy, etc.). A conventional wet separation/refinement process for a rare earth element may be employed instead of the steps S3 and S4. In the step S2, the rare earth halide or the resultant reactive product may be directly separated and recovered as gas components, depending on the reactive condition.

In the recovery of the intended rare earth element(s) according to the recovery method of the present invention using the extraction apparatus 100, the stainless steel scrap holding basket 115 containing the rare earth alloy 110 and a prescribed halide salt (liquid or solid) for extracting the intended rare earth element(s) which is to be a molten salt 114 after extraction are disposed in the steel crucible 113. Moreover, the steel crucible 113 is lid with a stainless foil 112, if necessary.

As the rare earth alloy 110 to be treated can be typically exemplified a scrap or sludge (processing and cutting shavings) of a rare earth magnet such as a Nd magnet or praseodymium (Pr) magnet.

However, as the rare earth alloy 110 may be exemplified an battery electrode containing (a) rare earth element(s) and a slug generated at the manufacture of a magnet alloy or a hydrogen absorbing alloy, in addition to the scrap or the sludge.

As the halide salt to be the molten salt 114 may be employed a compound made of at least one metal selected from the group consisting of Li, Na, K, Rb, Be, Mg, Ca, Sr, Ba, Ti, V, Cr, Mn, Fe, Co, Ni, Cu, Zn, Al, Si, Cd, Sb and Pb and at least one halogen selected from the group consisting of F, Cl, Br, and I, or a mixture of the compounds with the respective different compositions.

Concretely, LiF, NaF, KF, RbF, LiCl, NaCl, KCl, RbCl, LiBr, NaBr, KBr, RbBr, LiI, NaI, KI, RbI, $MgF_2$, $CaF_2$, $SrF_2$, $BaF_2$, $MgCl_2$, $CaCl_2$, $SrCl_2$, $BaCl_2$, $MgBr_2$, $CaBr_2$, $SrBr_2$, $BaBr_2$, $MgI_2$, $CaI_2$, $SrI_2$, $BaI_2$, etc. may be used.

Then, the steel crucible 113 is disposed in the reaction chamber 102 of which the interior temperature is kept within a temperature range of 1000K to 1500K with the heater 103, and kept for several hours to several ten hours. In this case, Nd or Dy contained in the rare earth alloy 110 is converted into the corresponding halide (NdClx, NdIx, DyClx, etc.) and extracted as the corresponding molten salt 114 (Step S1).

Then, the stainless steel scrap holding basket 115 is taken out of the molten salt 114 with the residues (e.g., Fe, B when the rare earth alloy is the Nd magnet) to obtain the molten salt 114 containing the corresponding rare earth halide dissolved therein (Step S2).

Then, the rare earth halide can be separated from the halide salt through distillation or the like (Step S3). Alternatively, the halide salt containing the rare earth halide may be dissolved in a prescribed aqueous solution to refine and separate the rare earth element from the halide salt through such a wet process (Steps S3, S4).

Here, the concrete structure of the extraction apparatus 100 is only an example, but may be appropriately changed in accordance with the size of the extraction apparatus and the extraction process. Moreover, the material used to each component such as the reaction chamber 102 and the steel crucible 113 is only exemplified, but may be appropriately changed in accordance with the kinds of the rare earth alloy 110 and the molten salt 114.

Then, the extraction principle for Nd and Dy will be described when a Nd magnet (Nd—Fe—B—Dy alloy) is used as the rare earth alloy 110 and $MgCl_2$ is used as the halide salt (molten salt 114).

Figure 3:
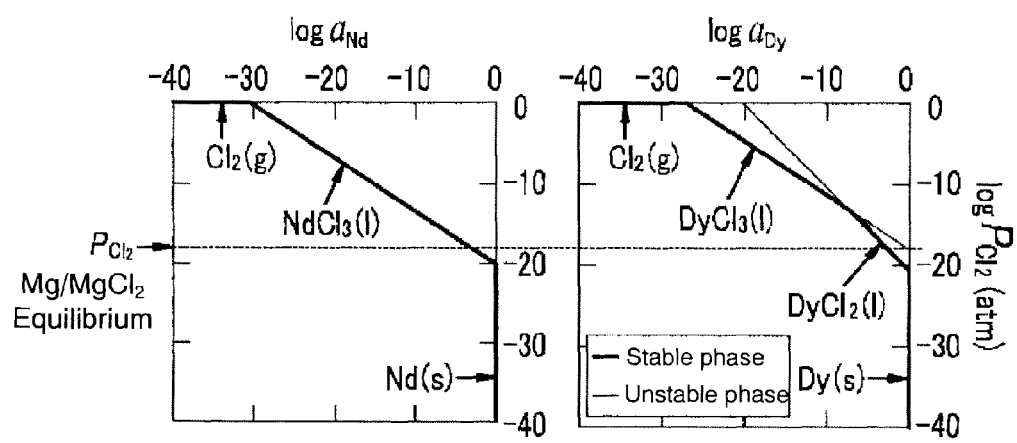
FIG. 3 is an isothermal potential diagram relating to a Nd—Cl system and a Dy—Cl system.

FIG. 3 is an isothermal chemical potential diagram relating to a Nd—Cl system and a Dy—Cl system at 1300K. In FIG. 3, the dot line depicted horizontally denotes a chlorine partial pressure at an equilibrium state of $Mg/MgCl_2$ using $MgCl_2$ as the molten salt 114. As shown in FIG. 3, it is expected a $NdCl_2$ phase and a $DyCl_2$ phase exist as stable phases, respectively under the chlorine partial pressure at the equilibrium state of $Mg/MgCl_2$. It is considered, therefore, that the extraction of the intended rare earth element from the Nd magnet through the reaction with $MgCl_2$ is conducted at 1300K by the following equation so that Nd and Dy are extracted as the corresponding chlorides in the molten salt 114.

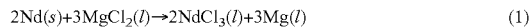

$$2Nd(s) + 3MgCl_2(l) \rightarrow 2NdCl_3(l) + 3Mg(l) \quad (1)$$

$\Delta G° = -151.6$ kJ at 1300K

$$Dy(s) + MgCl_2(l) \rightarrow DyCl_2 + Mg(l) \quad (2)$$

$\Delta G° = -57.6$ kJ at 1300K

In the extraction reaction of Nd and Dy using $MgCl_2$, Mg generated through the extraction reaction functions as a reactive element for enhancing the extraction efficiency. In this extraction reaction, the chemical potential of chlorine is a chloride partial pressure at the equilibrium state of $Mg/MgCl_2$. On the contrary, in the extraction reaction disclosed in Reference 1, the chemical potential of chlorine is a chloride partial pressure at an equilibrium state of $Fe/FeCl_2$ which is formed under a carbon reducing atmosphere. Therefore, the chemical reaction in the present invention is essentially different from the chemical reaction in Reference 1.

Moreover, even in the case that a halide salt containing a halogen except chlorine (Cl) is used, the intended rare earth halide can be extracted in the molten salt 114 efficiently by setting the reactive temperature based on the isothermal potential diagram relating to the rare earth element to be extracted and the halogen.

In this way, according to the recovery method of the first embodiment, the rare earth element contained in the rare earth alloy 110 can be extracted in the molten salt 114 by the extremely simple means of immersing and holding the rare earth alloy 110 in the molten salt 114 kept at a prescribed temperature.

Furthermore, since such a liquid as the molten salt 114 is used as an extraction agent, the intended rare earth element can be extracted efficiently from such a rare earth alloy as a complicated magnet scrap in shape or the like.

Then, since the intended rare earth element can be separated from the molten salt 114 by a well known means, the intended rare earth element can be easily recovered at a high efficiency.

In this embodiment, the rare earth halide is dissolved in the molten salt 114, but may be recovered as gas components. For example, the rare earth halide may be vaporized and recovered outside from the extraction system for extracting the intended rare earth element from the rare earth alloy 110 after or when the rare earth halide is extracted in the molten salt 114. Alternatively, a distillation apparatus is disposed above the steel crucible 113 so that the halide salt and the rare earth halide, which are evaporated from the steel crucible 113, may be separated.

In the present invention, moreover, since a halide salt, which is made of one(s) selected from among various metals and one(s) selected from among various halogens, is used as a reactive medium, an appropriate halide salt may be selected and used when another rare earth element except Nd and Dy is extracted in addition to the extraction of the rare earth element from the Nd magnet. As a result, the present invention can be applied for the extraction for various rare earth elements.

Second Embodiment

Figure 4:
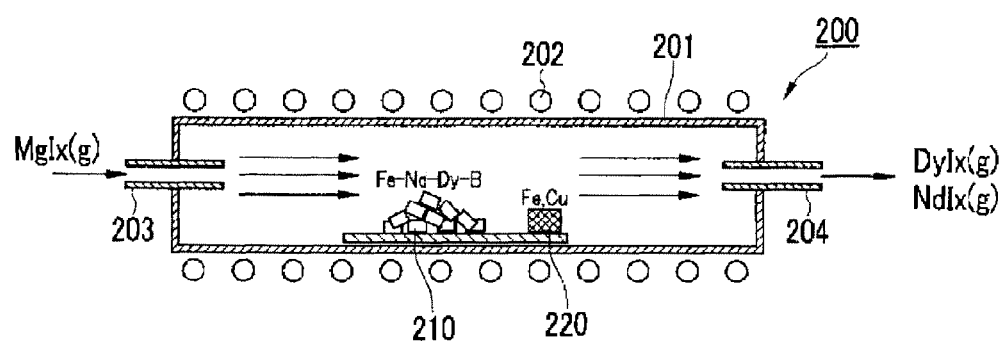
FIG. 4 is a view showing the extraction apparatus according to a second embodiment.

FIG. 4 is a view showing an embodiment of the extraction apparatus to be used in the recovery method of rare earth element in this embodiment. An extraction apparatus 200 shown in FIG. 4 includes a cylindrical reaction chamber 201, a heater 202, a gas inlet 203 provided at one end of the reaction chamber 201 and a gas outlet 204 provided at the other end of the reaction chamber 201. In the reaction chamber 201, a rare earth alloy 210 to be treated is disposed. Then, a halide salt gas or halogen gas as a reactive medium is supplied into the reaction chamber 201 from the gas inlet 203. Then, the resultant rare earth halide, which is produced through the reaction between the reactive medium and the rare earth alloy 210, is exhausted from the gas outlet 204.

Here, the concrete structure of the extraction apparatus 200 is only an example, but may be appropriately changed in accordance with the size of the extraction apparatus and the extraction process.

In the recovery of the intended rare earth element(s) using the extraction apparatus 200, the rare earth alloy 210 is disposed in the reaction chamber 210. As the rare earth alloy 210 to be treated can be typically exemplified a scrap, a sludge of a rare earth magnet such as a Nd magnet or Pr magnet or other rare earth alloy as in the first embodiment.

As the reactive medium gas to be supplied from the gas inlet 203 may be employed a compound made of at least one metal selected from the group consisting of Li, Na, K, Rb, Be, Mg, Ca, Sr, Ba, Ti, V, Cr, Mn, Fe, Co, Ni, Cu, Zn, Al, Si, Cd, Sb and Pb and at least one halogen selected from the group consisting of F, Cl, Br, and I, or a mixture of the compounds with the respective different compositions.

Concretely, LiF, NaF, KF, RbF, LiCl, NaCl, KCl, RbCl, LiBr, NaBr, KBr, RbBr, LiI, NaI, KI, RbI, $MgF_2$, $CaF_2$, $SrF_2$, $BaF_2$, $MgCl_2$, $CaCl_2$, $SrCl_2$, $BaCl_2$, $MgBr_2$, $CaBr_2$, $SrBr_2$, $BaBr_2$, $MgI_2$, $CaI_2$, $SrI_2$, $BaI_2$, etc. may be used.

Alternatively, as the reactive medium may be employed one or two or more halogen gases selected from the group consisting of F, Cl, Br, I.

Then, the interior of the reaction chamber 201 is kept within a temperature range of 600K to 1500K with the heater 202, and kept for several hours to several ten hours while the reactive medium gas is supplied from the gas inlet 203. In this case, Nd or Dy contained in the rare earth alloy 210 is converted into the corresponding halide (NdClx, NdIx, DyClx, etc.).

The thus generated rare earth halide is rendered in a state of gas or liquid based on the holding temperature of the reaction chamber 201. In the case that the rare earth halide is rendered in a state of gas, the rare earth halide is exhausted with the reactive medium gas not reacted from the gas outlet 204 and then recovered. Since a vaporized halide has a large temperature dependency of vapor pressure, the rare earth halide can be selectively condensed and recovered by controlling the temperature of a recovering system after the exhaust.

In the case that the rare earth halide is rendered in a state of liquid, the liquidized rare earth halide retained in the reaction chamber 201 is recovered. The rare earth halide, which is recovered in the state of gas or liquid, can be separated from the resultant byproducts and/or impurities by means of distillation or refinement and separation. In the refinement and separation, the rare earth halide is dissolved in a prescribed aqueous solution.

When the scrap or the like is used as the rare earth alloy 210, a coexisting metal 220 such as iron (Fe) and copper (Cu) is maintained in the reaction chamber 201. In the recovery method of the present invention, however, the halide gas as the reactive medium and the halogen gas (e.g., $MgCl_2$) is not reacted with such a coexisting metal 220 as Fe and/or Cu. Therefore, the intended rare earth element(s) can be extracted at high efficiency even from the rare earth alloy 210 containing the coexisting metal 220.

Since various halogen gases have respective large vapor pressures at a temperature of 600K or more, the halogen gas can be easily supplied as the state of gas to the rare earth alloy 210 such as the magnet alloy scrap and thus reacted with the rare earth alloy 210 if the interior temperature of the reaction chamber 201 is kept within a temperature of 600K to 1800K.

In general, since the halogen gas has a large vapor pressure and diffusion velocity at a higher temperature, chemically activated Nd or Dy contained in a magnet alloy can be easily reacted with the halogen gas to form the corresponding halide containing Nd or Dy. For example, when an $MgI_2$ gas is supplied into the reaction chamber 201 kept at 1300K, an $NdI_3$ component or a $DyI_3$ component may be generated as follows:

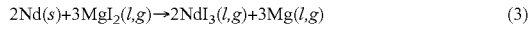

$$2Nd(s)+3MgI_2(l,g) \rightarrow 2NdI_3(l,g)+3Mg(l,g) \quad (3)$$

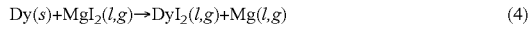

$$Dy(s)+MgI_2(l,g) \rightarrow DyI_2(l,g)+Mg(l,g) \quad (4)$$

Since the $NdI_3$ component or the $DyI_3$ component has a vapor pressure of $10^{-3}$ atm at a temperature of 1200K or more, the $NdI_3$ component or the $DyI_3$ component can be separated from the scrap as the state of gas. Concretely, the resultant halogen gas such as the $NdI_3$ component or the $DyI_3$ component is exhausted with the reactive medium gas not reacted from the gas outlet 204, and selectively condensed at a different temperature portion using the temperature dependency of vapor pressure thereof. As a result, the halogen gas can be separated and recovered efficiently.

The vapor pressure of an Nd chloride or a Dy chloride is $10^{-3}$ atm or less at a temperature of 1300K or less so that the separation of the Nd chloride or the Dy chloride as the state of gas is not practical. On the contrary, the vapor pressure of the Nd chloride or the Dy chloride is $10^{-3}$ atm or more within a temperature range of 1300K to 1800K so that the Nd chloride or the Dy chloride can be selectively separated as the state of gas and then recovered from the rare earth alloy 210.

For example, if a chloride gas such as FeClx, CuClx, ZnClx is introduced into the reaction chamber 201 kept at a temperature within the temperature range of 1300K to 1800K and reacted with the rare earth alloy 210 (rare earth alloy scrap), the intended Nd chloride or the Dy chloride can be selectively separated and recovered. A chloride not reacted with the coexisting metal such as Fe and Cu or an environment-friendly chloride not generating harmful waste is preferable as the thus obtained chloride gas. For example, $FeCl_3$ or $ZnCl_2$ may be exemplified.

In this way, according to the recovery method of the second embodiment, the rare earth element contained in the rare earth alloy 210 can be extracted as the state of gas or liquid by the extreme simple means of disposing the rare earth alloy 210 in the reaction chamber 201 kept at a predetermined temperature and supplying a halide salt gas or halogen gas as a reactive medium into the reaction chamber 201. In this embodiment, particularly, since the reactive medium gas is employed, the intended rare earth element can be easily extracted even from a complicated magnet scrap in shape by a simple apparatus. Such a magnet alloy as used in a motor of an automobile is incorporated in a complicated part in shape. Therefore, the separation and recovery method in this embodiment of supplying the reactive medium gas to selectively separate and recover the intended rare earth element is suitable for the high efficient processing for the scrap alloy or the rough recovery for the intended rare earth element. Moreover, since in many cases the magnet alloy scrap contains a coexisting metal such as Fe and Cu, the extraction and separation method which can be utilized under such a condition as containing the coexisting metal serves many uses.

Then, since the thus obtained rare earth halide can be separated by a well known means, the intended rare earth element can be easily recovered at a high efficiency.

In this embodiment, the reactive medium gas which is vaporized in advance is supplied into the reaction chamber 201 from the outside thereof via the gas inlet 203, but a solid or liquid halide salt is disposed in the reaction chamber 201 with the rare earth alloy 210 so that the vaporized halide salt is supplied to the rare earth alloy 210 by heating the halide salt.

Third Embodiment

Figure 5:
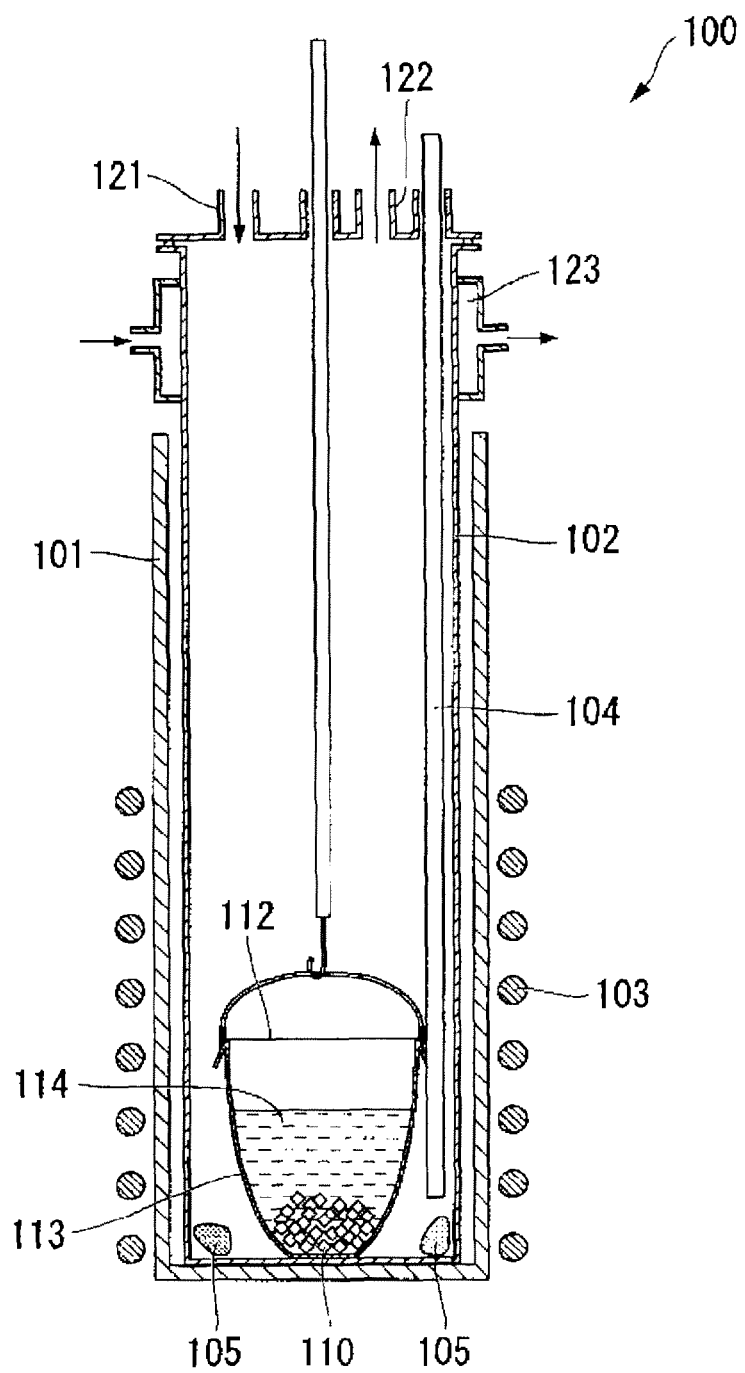
FIG. 5 is a view showing the extraction apparatus according to a third embodiment.

FIG. 5 is a view showing an embodiment of the extraction apparatus to be used in the recovery method of rare earth element in this embodiment. Like or corresponding components are designated by the same references in FIGS. 1 and 5.

An extraction apparatus 100 shown in FIG. 5 includes a cylindrical alumina tube 101, a reaction chamber 102 made of a stainless steel which is accommodated in the alumina tube 101, a heater 103 provided around the periphery of the alumina tube 101 and a steel crucible 113 provided in the reaction chamber 102. Herein, the alumina tube 101 has a bottom surface in addition to the side surface (periphery thereof). In the reaction chamber 102, a thermometer 104 for measuring an interior temperature of the reaction chamber 102 and a sponge titanium (getter material) 105 are provided. At the top side of the reaction chamber 102 are provided a gas inlet 121 for introducing a gas into the reaction chamber 102, a gas outlet 122 for exhausting a gas in the reaction chamber 102 and a cooling jacket 123 for cooling the reaction chamber 102.

In the steel crucible 113, a molten salt 114 and a rare earth alloy 110 such as a (Nd) magnet is disposed.

The kind of material consisting the crucible 113 is not limited, but may be any one of the materials which can conduct an appropriate extraction process while the impurities contained in the materials do not affect the extraction process of a substance to be disposed into the crucible 113. Here, the concrete structure of the extraction apparatus 100 is only an example, but may be appropriately changed in accordance with the size of the extraction apparatus and the extraction process. Moreover, the material making each component such as the reaction chamber 102 and the steel crucible 113 is only exemplified, but may be appropriately changed in accordance with the kinds of the rare earth alloy 110 and the molten salt 114.

Figure 6:
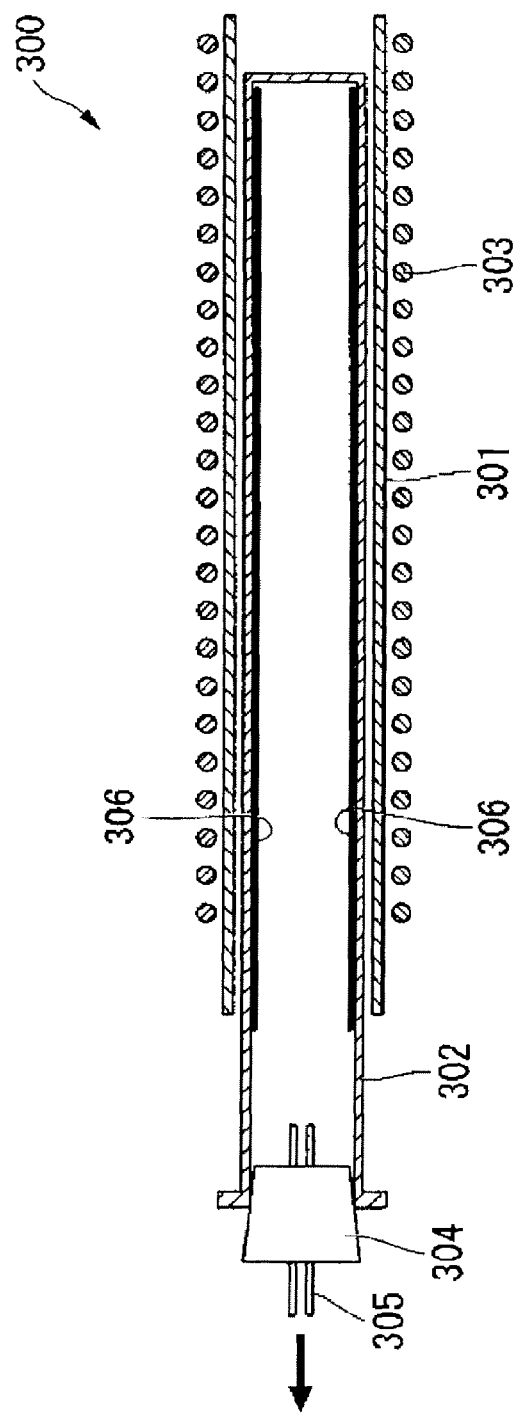
FIG. 6 is a view showing the distillation apparatus according to an embodiment of the present invention.

FIG. 6 is a view showing an extraction apparatus to be used in the recovery method of rare earth element in this embodiment. A distillation apparatus 300 shown in FIG. 6 includes an alumina tube 301, a reaction chamber 302 constituted of a quartz tube which is inserted in the alumina tube 301 and of which one end is closed, a heater 303 provided around the periphery of the alumina tube 301, a lid member 304 for closing the opening of the reaction chamber 302, and an intake and exhaust port 305 for communicating the outside and the interior of the reaction chamber 302. Here, the lid member 304 is made of, e.g., a synthetic resin, and the intake and exhaust port 305 is made of, e.g., a stainless steel. A titanium foil 306 is provided on the inner wall of the reaction chamber 302.

The concrete structure of the distillation apparatus 300 is only an example, but may be appropriately changed in accordance with the size of the distillation apparatus and the distillation process. Moreover, the material making each component such as the reaction chamber 302 is only exemplified, but may be appropriately changed in accordance with the kind of the molten salt 114 to be treated.

Figure 7:
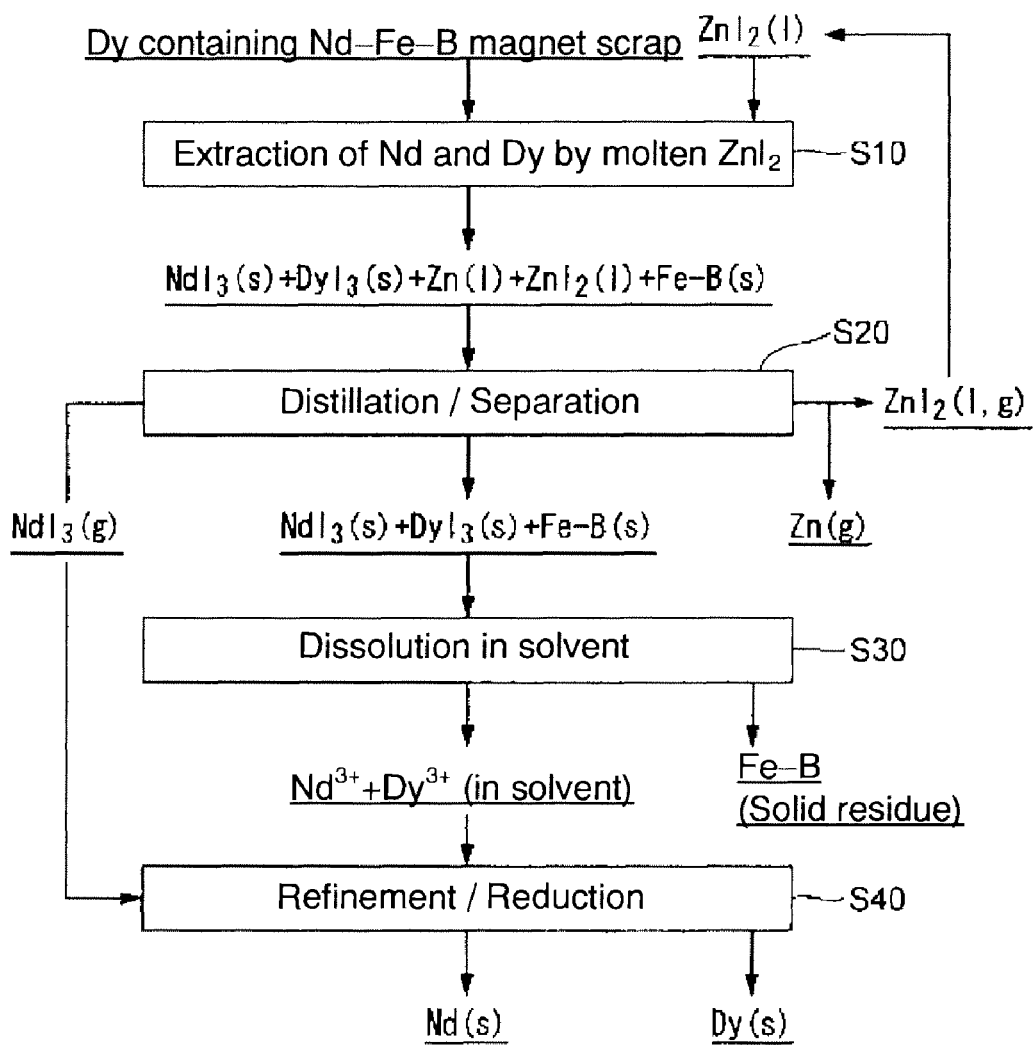
FIG. 7 is a flowchart showing a recovery method of rare earth metal according to the present invention.

FIG. 7 is a flowchart showing a recovery method of rare earth metal in this embodiment. As shown in FIG. 7, the recovery method in this embodiment includes a step S10 of extracting a rare earth element (Nd, Dy, etc.) from a rare earth alloy (e.g., a Dy-containing Nd magnet) using a halide salt (e.g., $ZnI_2$), a step S20 of separating the molten salt 114 into a gas component, a liquid component and a solid component containing a rare earth halide through the distillation of the molten salt 114 after extraction, a step S30 of dissolving the solid component ($NdI_3$, $DyI_3$, Fe—B, etc.) separated in the step S20 in a solvent to separate the rare earth element from the solid component, and a step S40 of reducing a rare earth compound generated through the refinement of the solution containing the rare earth element to obtain the rare earth element (Nd, Dy, etc.). The gas component and the liquid component separated in the step S20 contain Zn, $ZnI_2$, $NdI_3$, etc. The rare earth halide (e.g., $NdI_3$) contained in the gas component and the liquid component is refined and reduced as it is so that the rare earth element (e.g., Nd or Dy) is recovered. The halide salt contained in the gas component and the liquid component or the metal composing the halide salt (e.g., $ZnI_2$, Zn) may be reused as a halide salt.

In the recovery of the intended rare earth element(s) according to the recovery method of the present invention using the extraction apparatus 100 and the distillation apparatus 300, as shown in FIG. 5, the rare earth alloy 110 and a prescribed halide salt (liquid or solid) which is to be the molten salt 114 are disposed in the steel crucible 113. Moreover, the steel crucible 113 is lid with a stainless foil 112, if necessary.

As the rare earth alloy 110 to be treated can be typically exemplified a scrap or sludge (processing and cutting shavings) of a rare earth magnet such as a Nd magnet or a Pr magnet. However, as the rare earth alloy 110 may be exemplified an battery electrode containing (a) rare earth element(s) and a slug generated at the manufacture of a magnet alloy or a hydrogen absorbing alloy, in addition to the scrap or the sludge.

As the halide salt to be the molten salt 114 may be employed a compound made of at least one metal selected from the group consisting of Li, Na, K, Rb, Be, Mg, Ca, Sr, Ba, Ti, V, Cr, Mn, Fe, Co, Ni, Cu, Zn, Al, Si, Cd, Sb and Pb and at least one halogen selected from the group consisting of F, Cl, Br, and I, or a mixture of the compounds with the respective different compositions.

Concretely, LiF, NaF, KF, RbF, LiCl, NaCl, KCl, RbCl, LiBr, NaBr, KBr, RbBr, LiI, NaI, KI, RbI, $MgF_2$, $CaF_2$, $SrF_2$, $BaF_2$, $MgCl_2$, $CaCl_2$, $SrCl_2$, $BaCl_2$, $MgBr_2$, $CaBr_2$, $SrBr_2$, $BaBr_2$, $MgI_2$, $CaI_2$, $SrI_2$, $BaI_2$, etc. may be used. In this embodiment, a zinc iodide ($ZnI_2$) is employed as the halide salt.

Then, the steel crucible 113 is disposed in the reaction chamber 102 of which the interior temperature is kept at a predetermined temperature with the heater 103, and kept for several hours to several ten hours. In this case, Nd or Dy contained in the rare earth alloy 110 is converted into the corresponding halide and extracted as the corresponding molten salt 114 (Step S10). The keeping temperature is set within a temperature range of 740K to 900K, preferably within a temperature range of 740K to 800K when the $ZnI_2$ is employed as the halide salt. The keeping temperature may be appropriately determined in accordance with the kind of halide salt, e.g., within a temperature range of 600K to 1800K, preferably within a temperature range of 700K to 1300K when another halide salt is employed.

Then, a product in the crucible 113 obtained in the step S10 is distilled to separate a desired substance (e.g., Zn, $ZnI_2$, $NdI_3$, etc.) as a state of gas or liquid from the product and obtain a solid mixture as a solid component of the rare earth halide and the residue after the extraction (Step S20). In this case, the product may be taken out of the crucible 113, disposed in a given container again and distilled. Alternatively, the crucible 113 in the state of the step S10 may be distilled as it is. In the latter case, the extraction process and the distillation/separation process can be continuously conducted. The distillation temperature may be set within a temperature range of 600K to 1800K, preferably within a temperature range of 800K to 1300K, more preferably within a temperature range of 800K to 1000K when the $ZnI_2$ is employed as the halide salt. The distillation temperature may be appropriately determined in accordance with the kind of halide salt, e.g., within a temperature range of 600K to 1800K, preferably within a temperature range of 800K to 1300K when another halide salt is employed. The distillation process may be conducted in a vacuum atmosphere or a normal pressure atmosphere. Moreover, the distillation process may be preferably conducted in an inactive atmosphere.

Then, the rare earth halide (e.g., $NdI_3$) as the state of gas or liquid, which is separated in the distillation in the step S20, is reduced as it is, e.g., through thermal decomposition to obtain the rare earth element Alternatively, the halide salt as the state of gas or liquid or the metal composing the halide salt (e.g., $ZnI_2$, Zn) may be reused as a halide salt.

Then, the solid component (e.g., $NdI_3$, $DyI_3$, Fe—B, etc.) separated through the distillation is dissolved in a solvent to separate the rare earth element as a solution (Step S30). The solvent is appropriately selected so as to dissolve the rare earth element compound (e.g., $NdI_3$, $DyI_3$, etc.) to be recovered and not to dissolve other component or compound (e.g., Fe—B) not to be recovered. For example, a water, an organic solvent, or a weak acidic solvent may be employed. Preferably, the water is employed. The dissolution temperature is appropriately determined in accordance with the kind of solvent. In the use of the water as the solvent, the dissolution temperature is set within a temperature range of room temperature (298K) to 373K, preferably within a temperature range of room temperature (298K) to 323K.

Then, the solution containing the rare earth element is refined to obtain the corresponding rare earth compound, which is reduced to obtain the corresponding rare earth element (step S40). For example, the rare earth element contained as the corresponding rare earth ion in the solution is mutually separated from the solution by means of solvent extraction, and precipitated, e.g., as an oxide or a chloride by using an acid such as an oxalic acid which is well known technique. The precipitation such as the oxide or the chloride is supplied for a refinery process such as a metallothermic reduction process or a molten-salt electrolysis process, thereby to be reduced.

Then, the extraction principle for Nd and Dy will be described when a Nd magnet (Nd—Fe—B—Dy) is used as the rare earth alloy 110 and $ZnI_2$ is used as the halide salt (molten salt 114).

Figure 8:
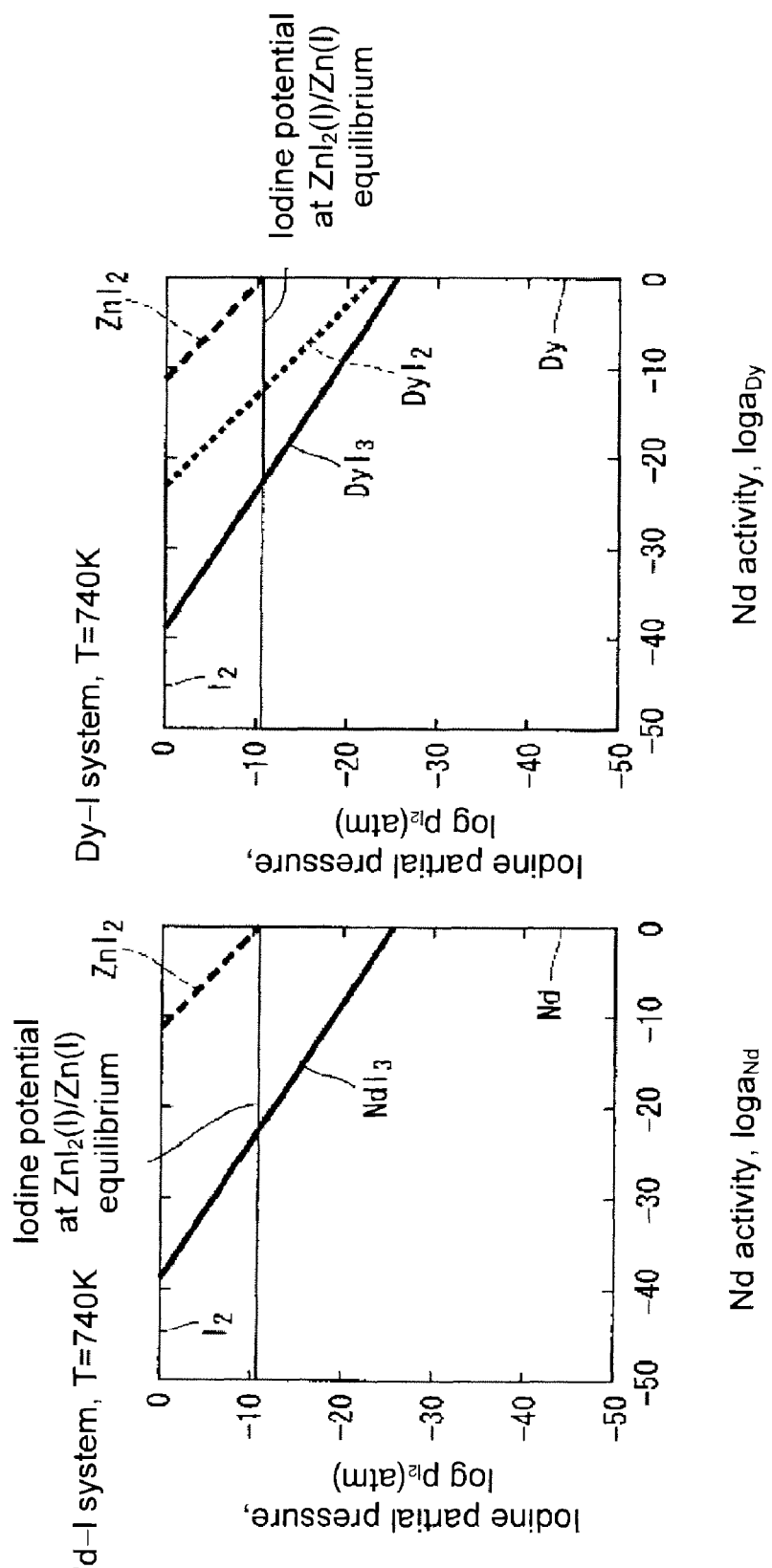
FIG. 8 is an isothermal potential diagram relating to a Nd—I system and a Dy—I system.

FIG. 8 is an isothermal chemical potential diagram relating to a Nd—I system and a Dy—I system at 700K. In FIG. 8, the solid line depicted horizontally denotes an iodine partial pressure at an equilibrium state of $ZnI_2/Zn$ using the $ZnI_2$ as the molten salt 114. As shown in FIG. 8, it is expected a $NdI_3$ phase and a $DyI_3$ phase exist as stable phases, respectively under the iodine partial pressure at the equilibrium state of $ZnI_2/Zn$. It is considered, therefore, that the extraction of the intended rare earth element from the Nd magnet through the reaction with the $ZnI_2$ is conducted at 740K by the following equation so that Nd and Dy are extracted as the corresponding iodides in the molten salt 114.

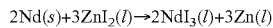

$\Delta G° = -472.0$ kJ at 740K

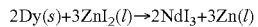

$\Delta G° = -613.27$ kJ at 740K

Moreover, even in the case that a halide salt containing a halogen except $ZnI_2$ is used, an intended rare earth halide can be extracted in the molten salt 114 efficiently by setting the reactive temperature based on the isothermal potential diagram relating to the rare earth element to be extracted and the halogen.

According to the recovery method of this embodiment, the rare earth element contained in the rare earth alloy 110 can be extracted in the molten salt 114 by the extreme simple means of immersing and holding the rare earth alloy 110 in the molten salt 114 kept at a prescribed temperature (within a temperature range of 740K to 900K in this embodiment). Furthermore, since such a liquid as the molten salt 114 is used as an extraction agent, the intended rare earth element can be extracted efficiently from such a rare earth alloy as a complicated magnet scrap in shape or the like.

Then, the molten salt 114 after the extraction is distilled at a predetermined temperature (within a temperature range of 600K to 1800K in this embodiment) to be separated into the gas component, the liquid component and the solid component containing the rare earth halide. The separated solid component is dissolved into the solvent to separate the rare earth element from the solid component in the state of the solution containing the rare earth element. The solution containing the rare earth element is refined to recover the corresponding rare earth element compound certainly. Then, the rare earth element compound is reduced to obtain the rare earth element.

In this embodiment, moreover, although the rare earth halide (e.g., $NdI_3$) is contained in the gas component and the liquid component which are separated by the distillation process, the rare earth halide can be reduced as it is by means of thermal decomposition. As a result, the recovery method can enhance the recovery efficiency of the rare earth element as a whole.

In this embodiment, a halide salt can be appropriately selected for any purpose as described above (e.g., dependent on the kind of rare earth element to be recovered and the kind of rare earth alloy to be treated). Therefore, an appropriate halide salt may be selected and used when another rare earth element except Nd and Dy is extracted in addition to the extraction of the rare earth element from the Nd magnet. As a result, the present invention can be applied for the extraction for various rare earth elements.

In this embodiment, the zinc iodide ($ZnI_2$) is employed as the halide salt. Since an iodide gas has a higher vapor pressure than a chloride gas, the keeping temperature in the distillation/separation process can be set to a lower temperature in the use of the iodide gas.

Fourth Embodiment

Figure 9:
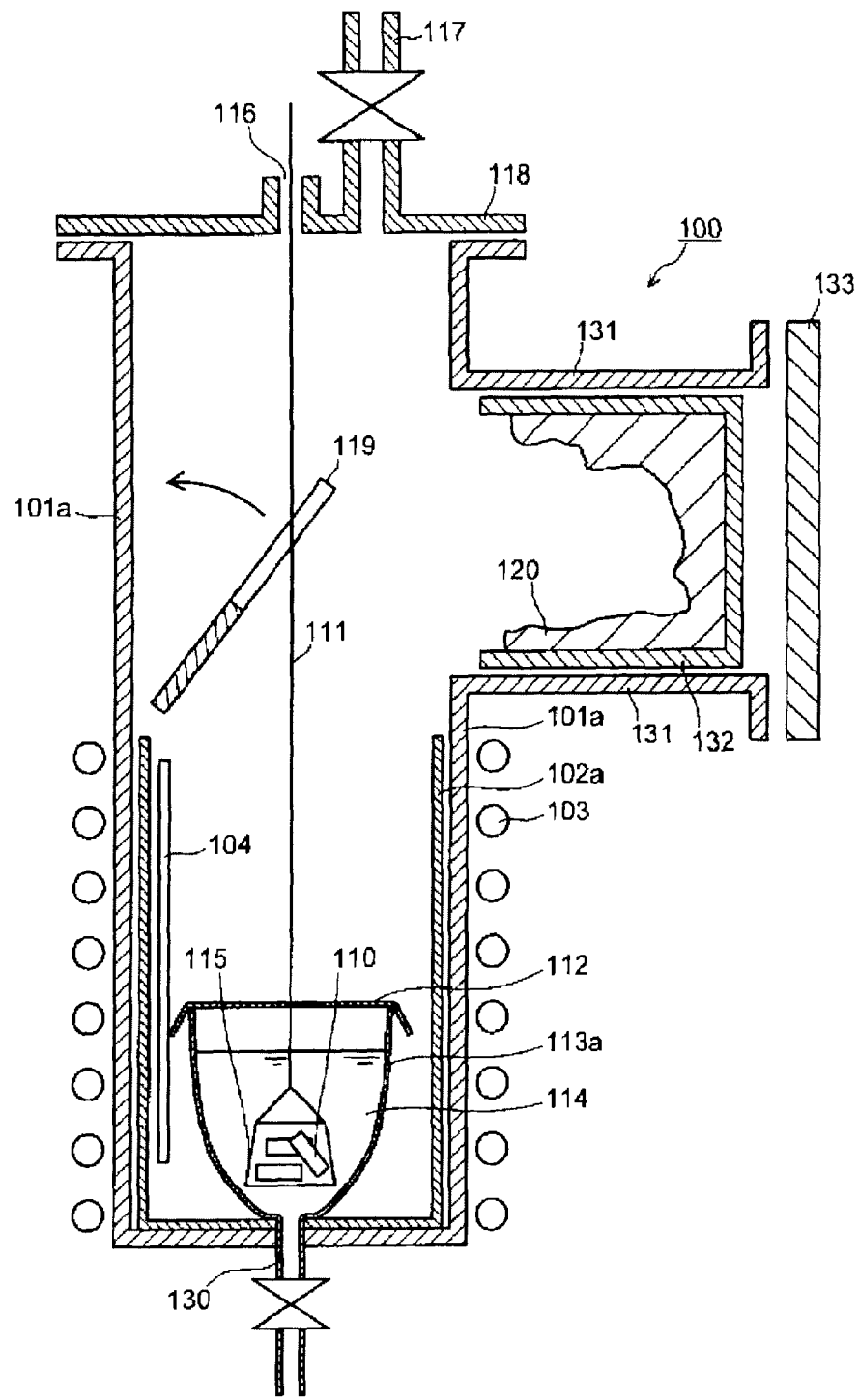
FIG. 9 is a view showing the extraction apparatus according to a fourth embodiment.

FIG. 9 is a view showing an embodiment of the extraction apparatus to be used in the recovery method of rare earth element in this embodiment. An extraction apparatus 100 shown in FIG. 9 includes a cylindrical alumina tube 101a, a reaction chamber 102a which is made of a stainless steel and accommodated in the alumina tube 101a, a heater 103a provided around the periphery of the alumina tube 101a and a steel crucible 113a provided in the reaction chamber 102a. Herein, the alumina tube 101 has a bottom surface in addition to the side surface (periphery thereof). Moreover, the height of the reaction chamber 102a is set lower than the height of the alumina tube 101a.

At the bottom of the crucible 113a is provided an exhaust port for a molten salt 114 so that the molten salt 114 in the crucible 113a is exhausted outside from the extraction apparatus 100 via a molten salt-outlet duct 130 which is formed so as to liquid-tightly penetrate the bottoms of the reaction chamber 102a and the alumina tube 101a.

The molten salt 114 is disposed in the crucible 113a, and a scrap holding basket 115 containing a rare earth alloy 110 therein, the rare earth alloy 110 being hung with a wire 111, is immersed in the molten salt 114.

The top of the alumina tube 101a functions as a slot for taking a scrap out or in, and covered with an openable and closable lid 118 where a wire insertion hole 116 and a molten raw material inlet 117 are formed. The exchange process of the molten raw material is conducted at the top of the alumina tube 101a by opening the lid 118.

At the top of the reaction chamber 102a is provided a retractable heat shielding plate 119 where a slit 119a for passing the wire 111 through the heat shielding plate 119 is formed. The top of the reaction chamber 102a is covered with the heat shielding plate 119 during a reaction process and opened during the injection of the molten raw material and the taking-out of the scrap by raising the heat shielding plate 119. In the case that an atmosphere gas is supplied into the reaction chamber 102a, the atmosphere gas is supplied via the molten raw material inlet 117.

At the side of the alumina tube 101a positioned above the reaction chamber 102a is provided a branch tube 131 made of an aluminum which is set to a predetermined precipitation temperature for an intended substance to be recovered. Then, a cylindrical precipitation recovering device 132, which functions as precipitating and recovering a gas component, is provided in the branch tube 131 so that the opening of the device 132 is directed at the reaction chamber 102a. Here, the device 132 has a bottom surface in addition to the cylindrical side surface. The end of the branch tube 131 functions as an inlet and outlet, and normally covered with an openable and closable lid 133 in the state where the precipitation recovering device 132 is accommodated in the branch tube 131.

In the reaction chamber 102a is provided a thermometer 104 for measuring the temperature of the interior of the reaction chamber 102a. This embodiment may be conducted in the same manner as the embodiments related to the flowcharts shown in FIGS. 2 and 7. According to the flowchart shown in FIG. 7, in this embodiment, the molten salt 114 is supplied in the crucible 113a disposed in the reaction chamber 102a kept at a predetermined temperature with the heater 103, and the scrap holding basket 115 containing the rare earth alloy 110 such as the Nd magnet therein is immersed and kept in the crucible 113a for several hours to several ten hours. In this case, Nd or Dy contained in the rare earth alloy 110 is extracted as the corresponding halide in the molten salt 114 (Step S10). The keeping temperature is set within a temperature range of 740K to 900K, preferably within a temperature range of 740K to 800K when the zinc iodide ($ZnI_2$) is employed as the halide salt. The keeping temperature may be appropriately determined in accordance with the kind of halide salt, e.g., within a temperature range of 600K to 1800K, preferably within a temperature range of 700K to 1300K when another halide salt is employed.

Then, the molten salt 114 containing a product, obtained in the step S10, in the crucible 113 is continuously heated and distilled to separate a desired substance (e.g., Zn, $ZnI_2$, $NdI_3$, etc.) as a state of gas from the molten salt 114 and precipitate a solid component ($NdI_3$, $DyI_3$, Fe—B, etc.) in the precipitation recovering device 132.

Then, the precipitation 120 containing the neodymium (Nd) halide or the dysprosium (Dy) halide is dissolved in a solvent to separate the rare earth element such as Nd or Dy as a solution (Step S30). The solvent is appropriately selected so as to dissolve the rare earth element compound (e.g., $NdI_3$, $DyI_3$, etc.) to be recovered and not to dissolve other component or compound (e.g., Fe—B) not to be recovered. For example, a water, an organic solvent, or a weak acidic solvent may be employed. Preferably, the water is employed. The dissolution temperature is appropriately determined in accordance with the kind of solvent. In the use of the water as the solvent, the dissolution temperature is set within a temperature range of room temperature (298K) to 373K, preferably within a temperature range of room temperature (298K) to 323K.

The solution is reduced and refined by means of wet process to recover the intended rare earth element (Step S40).

According to the forth embodiment of the present invention, since the extraction process and the distillation process can be semi-automatically conducted in the same apparatus, the recovery process can be simplified and the recovery cost can be reduced.

EXAMPLE

Then, some examples in the present invention will be described.

Example 1

In this example, Nd and Dy were extracted from a Nd magnet alloy using the extraction apparatus shown in FIG. 1.

First of all, an anhydrous magnesium chloride ($MgCl_2$) was sufficiently dried under a vacuum atmosphere, and disposed in the steel crucible 113 with a neodymium magnet alloy (26% Nd, 5% Dy, 68% Fe, 1% B) contained in the scrap holding basket 115. The steel crucible 113 was input into the reaction chamber 102 kept at 1273K, and maintained under an Ar gas atmosphere for 3 hours to 12 hours. After the reaction, the scrap holding basket 115 was pulled up while the steel crucible 113 was gradually cooled down in an electric furnace, thereby recovering the molten salt 114 and the magnet alloy sample in the steel crucible 113.

For the recovered molten salt 114 and the magnet alloy, phase identification was conducted by means of X-ray diffraction (XRD) and composition analysis was conducted by means of inductively coupled plasma atomic emission spectrometry (ICP-AES) and potentiometric titration.

Figure 10:
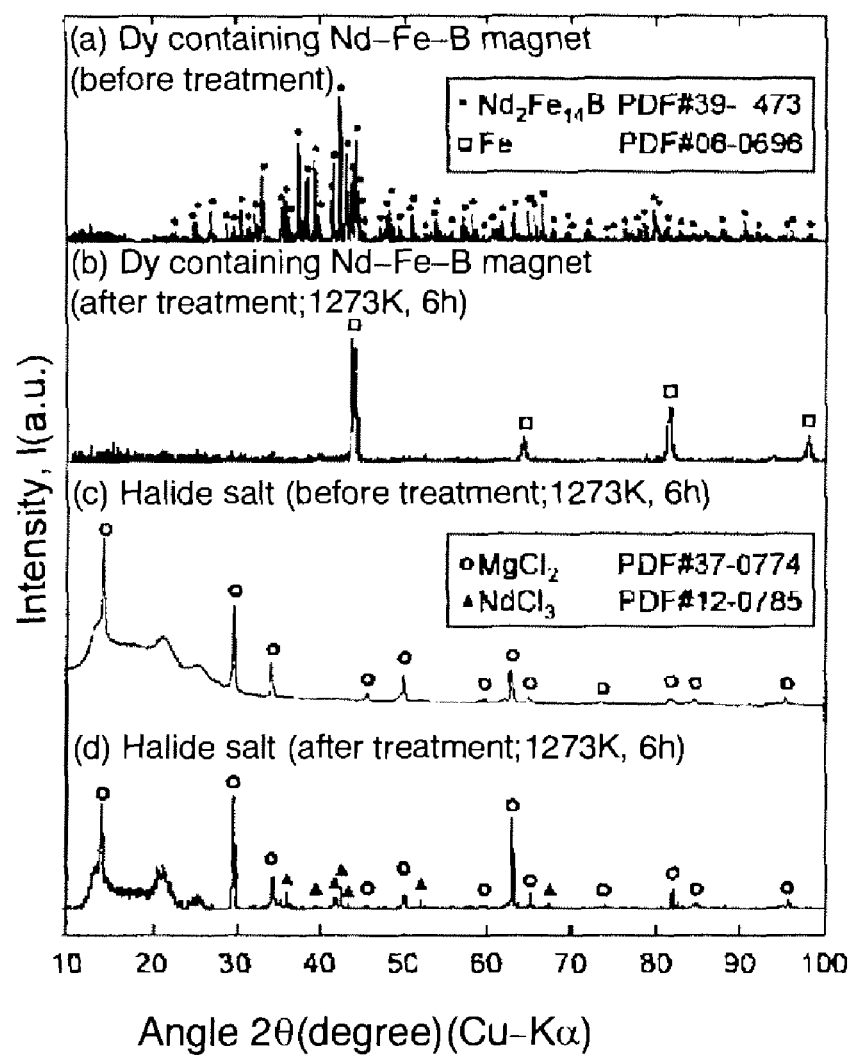
FIG. 10 is a view showing XRD measurement results.

FIG. 10 shows the XRD patterns of the Nd magnet alloy sample and the molten salt 114 after and before the Nd magnet alloy sample was immersed in the molten salt 114 for 6 hours.

With the Nd magnet alloy before the extraction process through the immersion, the existence of a $Nd_2Fe_{14}B$ phase as a main phase of a Nd magnet was recognized, but with the Nd magnet alloy after the extraction process through the immersion, only the existence of a Fe phase was recognized. Moreover, a $NdCl_3$ phase was observed in addition to the initial $MgCl_2$ phase before the extraction process, which means that the $NdCl_3$ salt was newly obtained after the extraction process. Therefore, it is confirmed that Nd of the Nd magnet alloy was extracted as a chloride in the molten salt 114.

Then, the content rate of the rare earth element $Ri^{M/M}$ of the magnet alloy sample was calculated from the weight of the magnet alloy sample and the contents of Nd and Dy after and before the experiment by the following equation (5). Moreover, the extraction rate of the rare earth element $Ri^{S/M}$ was calculated from the contents of Nd and Dy transferred into the molten salt 114 from the Nd magnet alloy sample by the following equation (6).

$$R_i^{M/M} = \frac{w_{i,alloy}}{w_{i,alloy}^0} \times 100 \qquad (5)$$

$$R_i^{S/M} = \frac{w_{i,salt}}{w_{i,alloy}^0} \times 100 \qquad (6)$$

Figure 11:
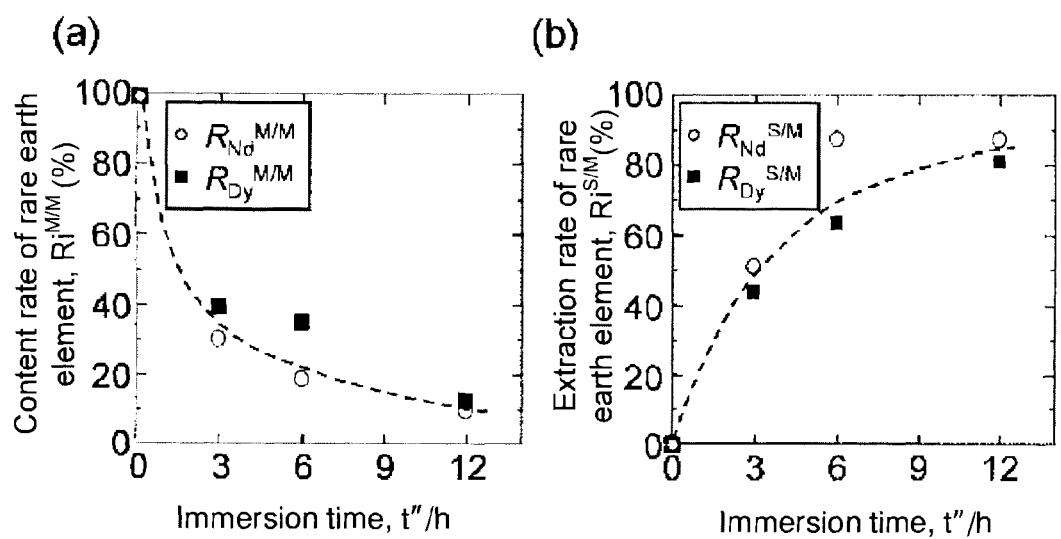
FIG. 11 is a view showing the relation between the reaction time and extraction ratio.

$w_{i,alloy}^0$: Weight of elemental $i$ in initial alloy $w_{i,alloy}$: Weight of elemental $i$ in alloy after experiment $i$: Nd or Dy FIG. 11 plots the calculated results relating to the $Ri^{M/M}$ and $Ri^{S/M}$ with the immersion time t". As apparent from FIG. 11, the weight of the rare earth element of the Nd magnet alloy is decreased as the immersion time t" is increased, so that Nd or Dy can be extracted at an extraction rate of 80% or more, depending on the condition.

From the above experiment results, it is experimentally turned out that the rare earth element of the rare earth alloy can be selectively chlorinated using the molten $MgCl_2$ and thus extracted.

It is thermodynamically considered that the production reaction of $DyCl_2$ proceeds, but in this experiment, the existence of the $DyCl_2$ was not identified by means XRD, which may be originated from that the concentration of Dy in the molten salt 114 is low (~4%). Moreover, it is considered that the liquid Mg as a reactive product may contribute to the promotion of the extraction reaction.

Example 2

In this example, Nd and Dy were extracted from a Nd magnet alloy using the extraction apparatus 100 shown in FIG. 1 and the extraction apparatus 300 shown in FIG. 6.

First of all, using the extraction apparatus 100, the mixture of the molten salt ($ZnI_2$) and the scraps of the Nd magnet alloy was disposed in the crucible 113, and treated at a reaction temperature of 740K for a reaction time of 12 hours. For the molten salt 114 after the extraction, the concentrations of Zn, Nd, Dy and Fe were determined by means of inductively coupled plasma atomic emission spectrometry (ICP-AES) while I was measured by means of potentiometric titration, thereby conducting the composition analysis for the molten salt. As a result, 5.6 mass % of Nd and 1.1 mass % of Dy were detected from the molten salt 114 after the treatment.

Then, vacuum distillation was conducted for the sample obtained in the extraction process using the distillation apparatus 300 at 1073K for one hour.

Figure 12:
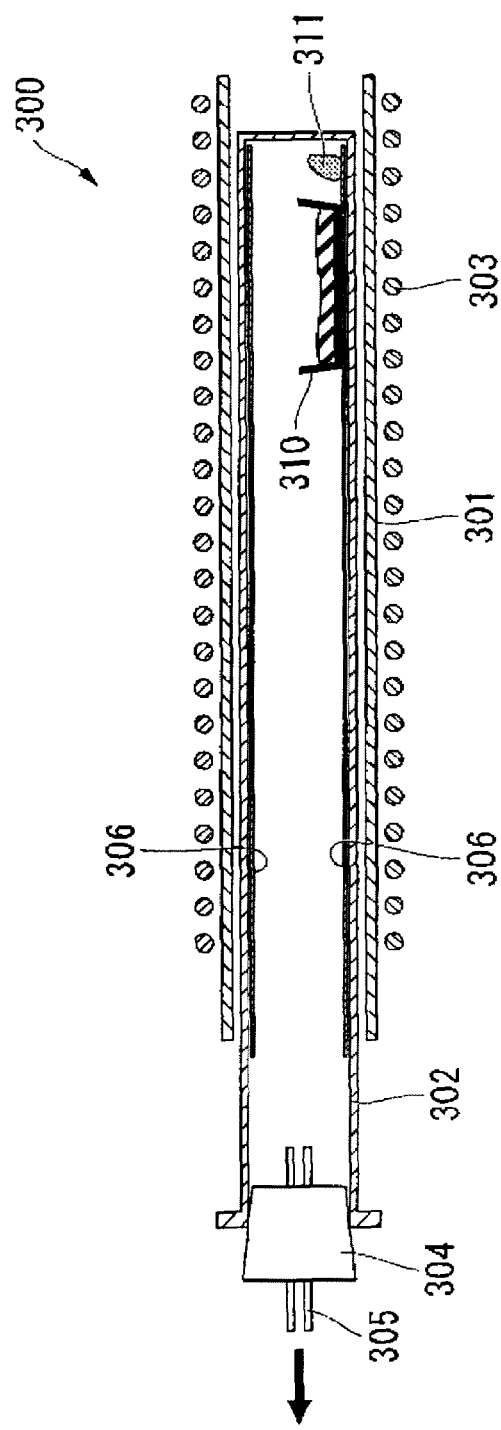
FIG. 12 is an explanatory view relating to the use of the extraction apparatus according to an example.

As shown in FIG. 12, the container (crucible made of a stainless steel) 310 containing the sample obtained in the Step S10 and the sponge titanium 311 were disposed in the reaction chamber 302. Then, the titanium (Ti) foil 306 is provided on the inner wall of the reaction chamber 302 so as to recover the sample. After the interior of the reaction chamber 302 was evacuated by a vacuum pump, an Ar gas was charged into the reaction chamber 302 so as to render the interior of the reaction chamber 302 under an inert gas atmosphere. After the process was repeated several times, the interior of the reaction chamber 302 was evacuated by the vacuum pump. Then, the container (crucible) of the reaction chamber 302 was heated to 1073K with the heater 303 and kept for 6 hours while the interior of the reaction chamber 302 continued to be evacuated by the vacuum pump. After the reaction, the reaction chamber 302 was gradually cooled down so that the precipitation formed on the inner wall of the reaction chamber 203 and the residual solid component in the container (crucible) were recovered.

Figure 13:
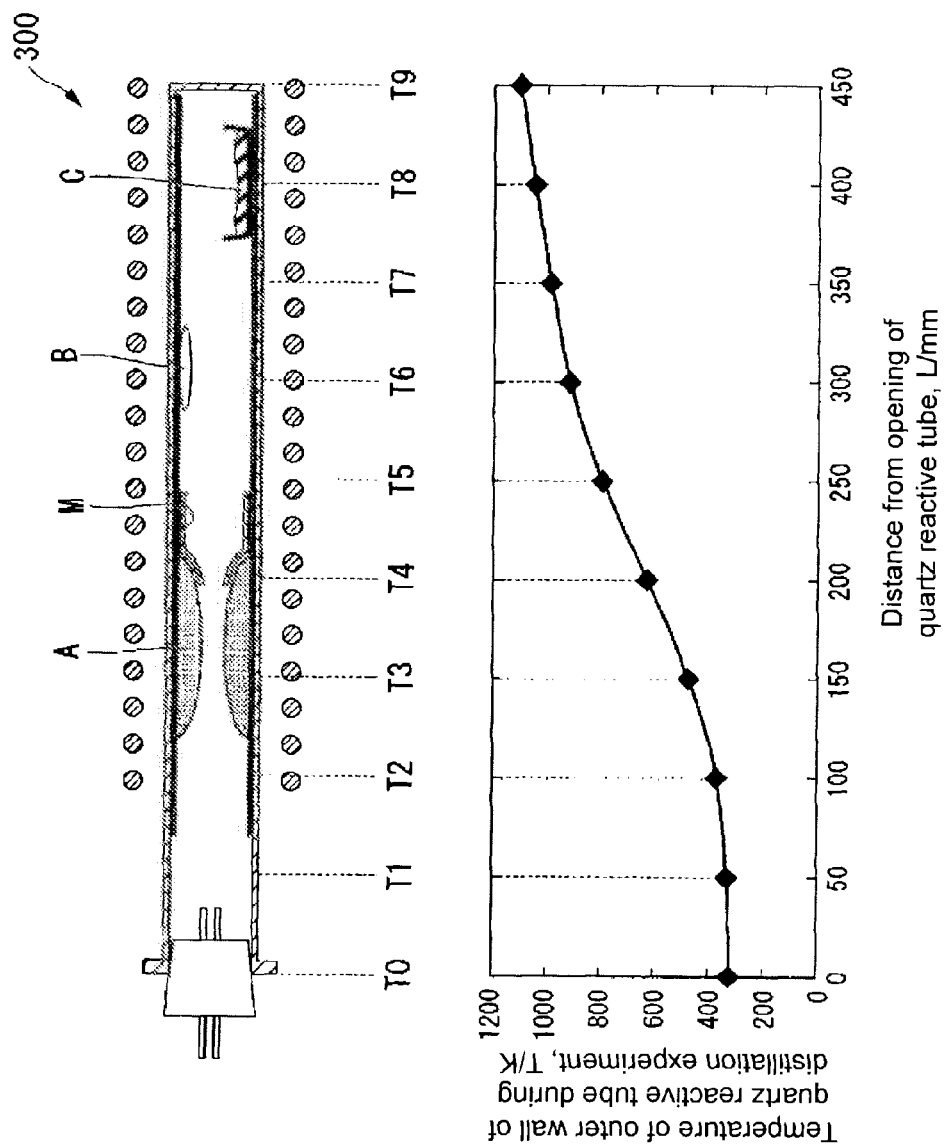
FIG. 13 is a view showing a precipitation state from the distillation according to an embodiment.
Figure 14:
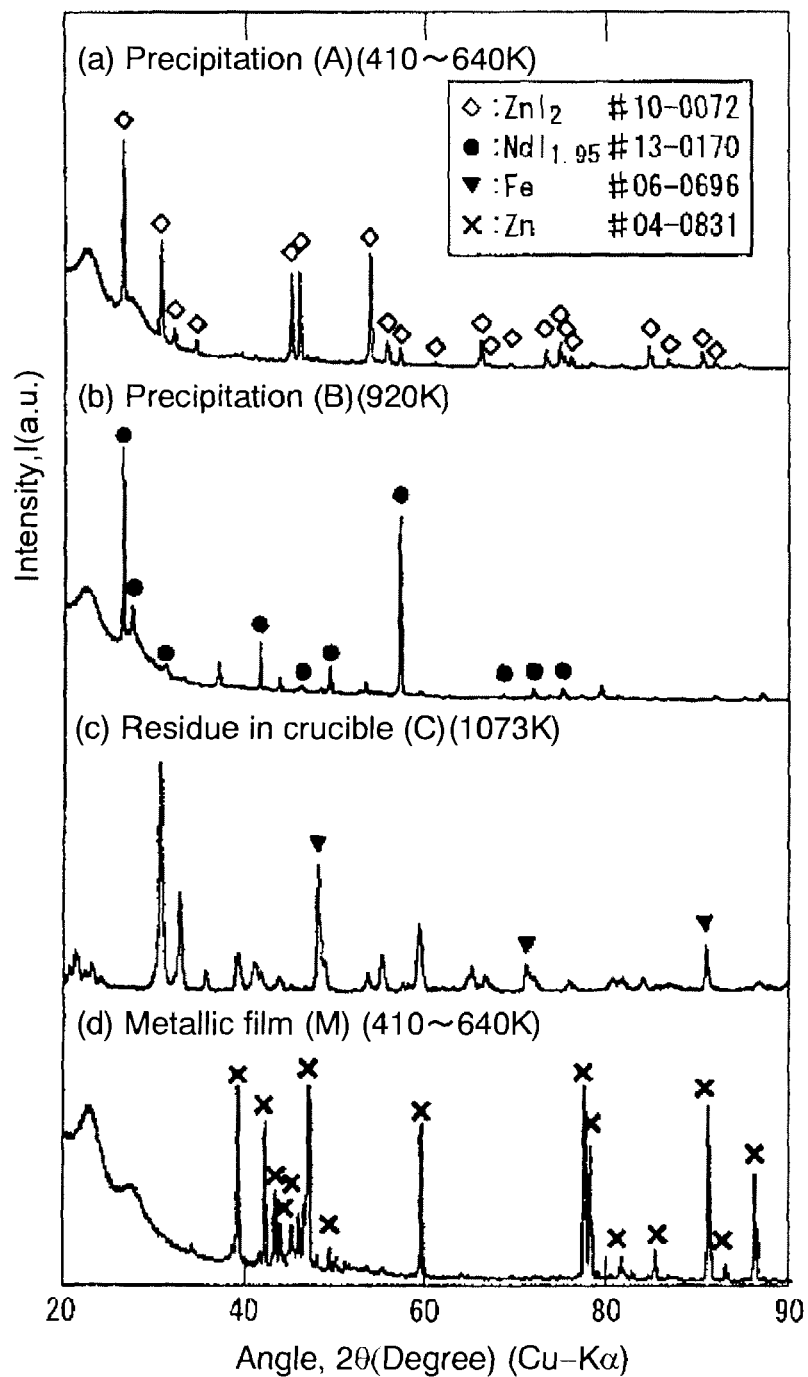
FIG. 14 is a view showing XRD measurement results.

FIG. 13 shows the positions and temperatures of the precipitations A, B obtained through the above process and the solid component C in the container (crucible), respectively. FIG. 14 shows the XRD measurement results for them.

As a result, the $ZnI_2$ component was recognized in the precipitation A within a lower temperature range of 410K to 640K, and the $NdI_{1.95}$ component was recognized in the precipitation B at a higher temperature of 920K, and Fe was recognized in the solid component C in the container (crucible) 310. The production of the lower iodide of the $NdI_{1.95}$ component is originated from that the produced $NdI_3$ and Nd of the magnet alloy are reacted with one another to produce such a $NdI_x$ (x<3) component. Moreover, a metallic film M was adhered to the precipitation A and confirmed as a Zn film.

Then, the concentrations of Zn, Nd, Dy and Fe were determined by means of inductively coupled plasma atomic emission spectrometry (ICP-AES) while I was measured by means of potentiometric titration. As a result, it was confirmed that the precipitation B contains 25.1 mass % of Nd and 2.7 mass % of Dy. Moreover, it was confirmed that the solid component C in the container (crucible) contains 18.2 mass % of Nd, 3.5 mass % of Dy and 46.5 mass % of Fe.

Then, when the solid component C remaining in the container (crucible) was immersed in a distilled water, the solid component C was partially dissolved in the aqueous phase to obtain the corresponding solid residue.

Figure 15:
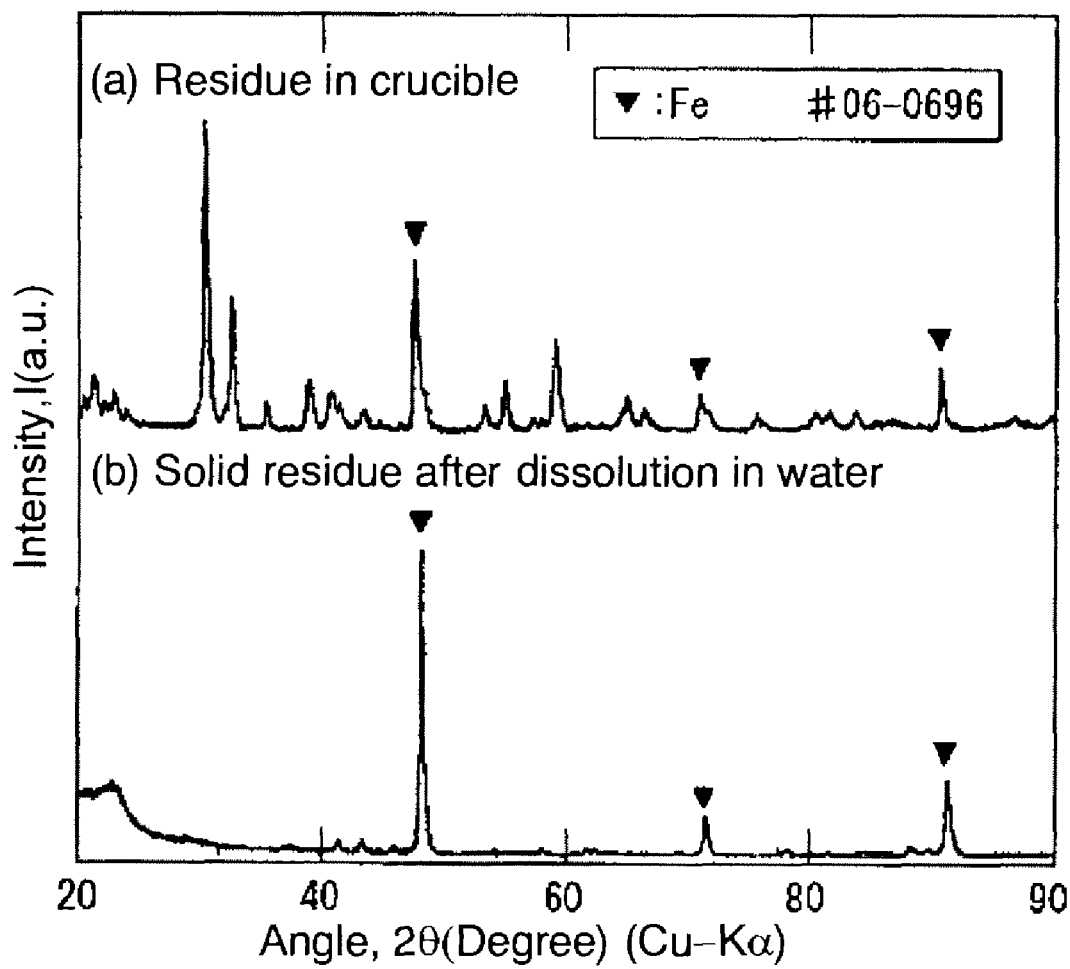
FIG. 15 is a view showing XRD measurement results.

FIG. 15 shows the XRD measurement results for the solid residue. From FIG. 15, the existence of Fe was confirmed. Only the rare earth element and I were detected from the aqueous phase, which means that the rare earth element succeeded in being extracted in the aqueous phase. Then, the concentrations of Zn, Nd, Dy and Fe were determined by means of inductively coupled plasma atomic emission spectrometry (ICP-AES) while I was measured by means of potentiometric titration. As a result, it was confirmed that the compound dissolved in the aqueous phase contains 28.9 mass % of Nd and 1.4 mass % of Dy.

As a result, it was confirmed that if the rare earth element of the magnet alloy was selectively iodated and extracted in the molten salt by using the molten $ZnI_2$ so that the product after the extraction process was distilled and separated, the rare earth element can be recovered from the solid component.

What is claimed is:

1. A recovery method of rare earth element in a form of a compound, comprising a step of reacting a rare earth alloy scrap coexisting with at least one of Fe and Cu with a metallic chloride gas within a temperature range of 1300K to 1800K to selectively extract, separate and recover a rare earth element of said rare earth alloy scrap in a state of a vapor of a corresponding rare earth element chloride.

2. A recovery method of rare earth element in a form of a compound, comprising a step of reacting a rare earth alloy scrap containing at least one of Nd and Dy and coexisting with at least one of Fe and Cu with at least one metallic chloride gas selected from the group consisting of $FeCl_x$, $CuCl_x$, and $ZnCl_x$ within a temperature range of 1300K to 1800K to selectively extract, separate and recover said at least one of Nd and Dy in a state of a vapor of a corresponding rare earth element chloride.

3. A recovery method of rare earth element in a form of a compound, comprising a step of reacting a rare earth alloy scrap containing at least one of Nd and Dy and coexisting with at least one of Fe and Cu with a metallic iodide gas to selectively extract, separate and recover said at least one of Nd and Dy in a state of a vapor of a corresponding rare earth element iodide.

* * * * *